United States Patent
Cho et al.

(10) Patent No.: US 10,673,524 B2
(45) Date of Patent: Jun. 2, 2020

(54) OPTICAL REPEATER ADJUSTING POWER OF OUTPUT OPTICAL SIGNAL AND OUTPUT ELECTRICAL SIGNAL AND METHOD PERFORMED BY THE OPTICAL REPEATER

(71) Applicant: ELECTRONICS AND TELECOMMUNICATIONS RESEARCH INSTITUTE, Daejeon (KR)

(72) Inventors: Seung-Hyun Cho, Sejong-si (KR); Joonyoung Kim, Daejeon (KR); Minkyu Sung, Seoul (KR); Jong Hyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/190,905

(22) Filed: Nov. 14, 2018

(65) Prior Publication Data

US 2019/0165858 A1 May 30, 2019

(30) Foreign Application Priority Data

Nov. 29, 2017 (KR) ........................ 10-2017-0161259

(51) Int. Cl.
*H04B 10/00* (2013.01)
*H04B 10/08* (2006.01)
*H04B 17/00* (2015.01)
*H04B 10/06* (2006.01)
*H04B 10/079* (2013.01)
(Continued)

(52) U.S. Cl.
CPC . *H04B 10/07955* (2013.01); *H04B 10/25752* (2013.01); *H04B 10/29* (2013.01); *H04J 14/0221* (2013.01); *H04W 24/08* (2013.01); *H04B 2210/006* (2013.01); *H04W 88/085* (2013.01)

(58) Field of Classification Search
CPC combination set(s) only.
See application file for complete search history.

(56) References Cited

U.S. PATENT DOCUMENTS 6,567,987 B1 * 5/2003 Farhan ............... H04N 7/17309
348/193
6,678,431 B2 * 1/2004 Han ..................... G02B 6/2713
385/11

(Continued)

FOREIGN PATENT DOCUMENTS

KR 10-0154540 B1 11/1998
KR 10-2000-0074732 A 12/2000

(Continued)

*Primary Examiner* — David C Payne
*Assistant Examiner* — Pranesh K Barua
(74) *Attorney, Agent, or Firm* — LRK Patent Law Firm (57) ABSTRACT

An optical repeater performs an electrical-to-optical conversion based on a power level of an optical signal or an optical modulation index (OMI) required by a radio unit or a host unit connected to the optical repeater. Further, the optical repeater performs an optical-to-electrical conversion based on a power level of a radio frequency (RF) signal required by the radio unit or the host unit connected to the optical repeater.

13 Claims, 3 Drawing Sheets

(51) Int. Cl.
*H04B 10/29* (2013.01)
*H04W 24/08* (2009.01)
*H04J 14/02* (2006.01)
*H04B 10/2575* (2013.01)
*H04W 88/08* (2009.01)

(56) References Cited

U.S. PATENT DOCUMENTS

| | | | | |
|---|---|---|---|---|
| 7,440,699 B1* | 10/2008 | Stewart, II | H04B 10/25756 | 398/116 |
| 8,897,657 B2* | 11/2014 | Sluz | H04B 10/674 | 359/333 |
| 9,014,571 B2* | 4/2015 | Khalouf | H04B 10/25754 | 398/193 |
| 10,135,532 B2* | 11/2018 | Ponzini | H04J 14/0298 | |
| 2005/0003786 A1* | 1/2005 | Inoue | H03G 3/3084 | 455/263 |
| 2005/0025504 A1* | 2/2005 | Huang | H04B 10/6931 | 398/202 |
| 2005/0047780 A1* | 3/2005 | Hoshida | H04B 10/67 | 398/33 |
| 2005/0265730 A1* | 12/2005 | Yasue | H04B 10/503 | 398/183 |
| 2007/0111686 A1* | 5/2007 | Lee | H03F 1/0261 | 455/127.3 |
| 2007/0189780 A1* | 8/2007 | Riggsby | H03G 3/3084 | 398/202 |
| 2008/0101801 A1* | 5/2008 | Khalouf | H04B 10/25754 | 398/193 |
| 2008/0212968 A1* | 9/2008 | Lindop | H04B 10/032 | 398/91 |
| 2010/0303471 A1* | 12/2010 | Khalouf | H04B 10/504 | 398/186 |
| 2010/0321086 A1* | 12/2010 | See | H04B 1/0458 | 327/359 |
| 2010/0321108 A1* | 12/2010 | Lee | H03G 3/3042 | 330/131 |
| 2012/0230683 A1* | 9/2012 | Lacatus | H04B 10/25758 | 398/38 |
| 2013/0114471 A1* | 5/2013 | Lee | H03F 1/0261 | 370/278 |
| 2013/0302029 A1 | 11/2013 | Lee et al. | | |
| 2014/0233677 A1* | 8/2014 | Zhang | H04L 25/06 | 375/297 |
| 2015/0304064 A1* | 10/2015 | Mutalik | H04Q 11/0005 | 398/48 |
| 2016/0028482 A1* | 1/2016 | Bujanos | H04B 10/07955 | 398/115 |
| 2016/0218801 A1* | 7/2016 | Chung | H04B 10/07953 | |
| 2017/0244486 A1 | 8/2017 | Han et al. | | |
| 2018/0337641 A1* | 11/2018 | Prentice | H04B 10/25753 | |

FOREIGN PATENT DOCUMENTS

| | | |
|---|---|---|
| KR | 10-0802454 B1 | 2/2008 |
| KR | 10-2010-0107906 A | 10/2010 |
| KR | 10-2011-0116374 A | 10/2011 |
| KR | 10-1646512 B1 | 8/2016 |

* cited by examiner

OPTICAL REPEATER ADJUSTING POWER OF OUTPUT OPTICAL SIGNAL AND OUTPUT ELECTRICAL SIGNAL AND METHOD PERFORMED BY THE OPTICAL REPEATER

CROSS-REFERENCE TO RELATED APPLICATION(S)

This application claims the priority benefit of Korean Patent Application No. 10-2017-0161259, filed Nov. 29, 2017, in the Korean Intellectual Property Office, the disclosure of which is incorporated herein by reference for all purposes.

BACKGROUND

1. Field

One or more example embodiments relate to an optical repeater.

2. Description of Related Art

With the development of mobile, communication technologies to 5G via 3G and 4G, a volume of traffic to be processed by a base station for mobile communication is nearly up to 20 gigabits per second (Gbps). It is expected, if the volume of traffic increases like this, an optical infrastructure utilizing an existing digital optical transmission scheme may need to receive the maximum data traffic increased hundred or more times when compared to a 4G mobile communication system. The optical infrastructure utilizing the digital optical transmission scheme is a network, over which digitally sampled data are transmitted between a radio unit located at a remote location and a host unit positioned at a central office (CO). To support digital data transmission of up to 20 Gbps, the optical infrastructure accommodates digitally sampled data traffic of 336 Gbps.

SUMMARY

An aspect provides an optical repeater which generates an optical signal satisfying a required optical modulation index (OMI).

Another aspect also provides an optical repeater which generates a radio frequency (RF) signal having a required power.

According to an aspect, there is provided an optical transmitter included in an optical repeater of a base station for mobile communication, the optical transmitter including an electrical interface configured to receive an RF signal, a first RF power measurement component configured to measure a power level of the received RF signal, an RF amplifier configured to amplify the RF signal passing through the first RF power measurement component, a second RF power measurement component configured to measure a power level of the amplified RF signal, an RF attenuator configured to adjust an amplitude of the RF signal passing through the second RF power measurement component, a third RF power measurement component configured to measure a power level of the amplitude adjusted RF signal, a laser diode configured to generate an optical signal using the RF signal passing through the third RF power measurement component, a laser diode output optical power measurement component configured to measure a power level of the output optical signal, and a controller configured to control an operation of at least one of the RF amplifier, the RF attenuator, and the laser diode based on the powers measured by the first RF power measurement component, the second RF power measurement component, the third RF power measurement component, and the laser diode output optical power measurement component such that an OMI of the optical signal may satisfy a preset OMI.

The controller may be configured to determine the OMI of the optical signal based on the power of the optical signal measured by the laser diode output optical power measurement component.

The controller may be configured to compare the preset OMI to the OMI of the optical signal, the preset OMI determined based on a power level of an optical signal received by a radio unit or a host unit that receives the optical signal.

The controller may be configured to adjust a gain of the RF amplifier based on a result of comparing the OMI of the optical signal and the preset OMI.

The controller may be configured to inject the RF signal passing through the third RF power measurement component into the RF amplifier, in response to determination that the gain of the RF amplifier is to be adjusted.

The optical transmitter may further include an optical interface configured to connect the optical repeater to an optical link, and a wavelength multiplexer/demultiplexer configured to transmit the optical signal output from the laser diode to the optical interface, and provide an optical signal input through the optical interface to an optical receiver included in the optical repeater, the optical receiver corresponding to the optical transmitter.

According to another aspect, there is provided an optical receiver included in an optical repeater of a base station for mobile communication, the optical receiver including a photodiode configured to convert an optical signal into an RF signal, a photodiode input optical power measurement component configured to measure a power level of the optical signal input into the photodiode, an RF amplifier configured to amplify the RF signal, a first RF power measurement component configured to measure a power level of the amplified RF signal, an RF attenuator configured to adjust an amplitude of the RF signal passing through the first RF power measurement, component, a second RF power measurement component configured to measure a power level of the amplitude adjusted RF signal, and a controller configured to control an operation of at least one of the RF amplifier and the RF attenuator based on the powers measured by the photodiode input optical power measurement component, the first RF power measurement component, and the second RF power measurement component such that a power level of the RF signal may satisfy a preset power level.

The controller may be configured to compare the preset power level to the power level of the RF signal, the preset power level determined based on a power level of an RF signal received by a radio unit or a host unit that receives the RF signal.

The controller may be configured to adjust a gain of the RF amplifier based on a result of comparing the power level of the RF signal and the preset power level.

The controller may be configured to adjust the power level of the RF signal passing through the second RF power measurement component into the RF amplifier, in response to determination that the gain of the RF amplifier is to be adjusted.

According to still another aspect, there is provided an optical signal transmitting method performed by an optical repeater, the optical signal transmitting method including measuring a power level of an RF signal input into the optical repeater, amplifying the RF signal based on an amplifier gain, measuring a power level of the amplified RF signal, attenuating the amplified RF signal based on an attenuation level, measuring a power level of the attenuated RF signal, determining whether to adjust the amplifier gain by comparing the power level of the attenuated RF signal and a preset power level, converting the attenuated RF signal from an electrical signal into an optical signal, in response to determination that the amplifier gain is not to be adjusted, and transmitting the optical signal generated by converting the attenuated RF signal.

The transmit procedure may include measuring a power level of the optical signal, and determining the OMI of the optical signal based on the power level of the optical signal.

The optical signal transmitting method may further include determining whether to adjust the amplifier gain by comparing the determined OMI to a preset OMI.

The preset OMI may be determined based on a power level of an optical signal received by a radio unit or a host unit that includes the optical repeater.

The optical, signal transmitting method may further include injecting the attenuated RF signal into an, amplifier having the adjusted amplifier gain, in response to determination that the amplifier gain is to be adjusted.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

The following structural or functional descriptions are exemplary to merely describe the example embodiments, and the scope of the embodiments is not limited to the descriptions provided herein.

Various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding, component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or, groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, the example embodiments will be described in detail with reference to the accompanying drawings. However, the scope of the present application is not limited to the example embodiments. In the drawings, like reference numerals are used for like elements.

Figure 1:
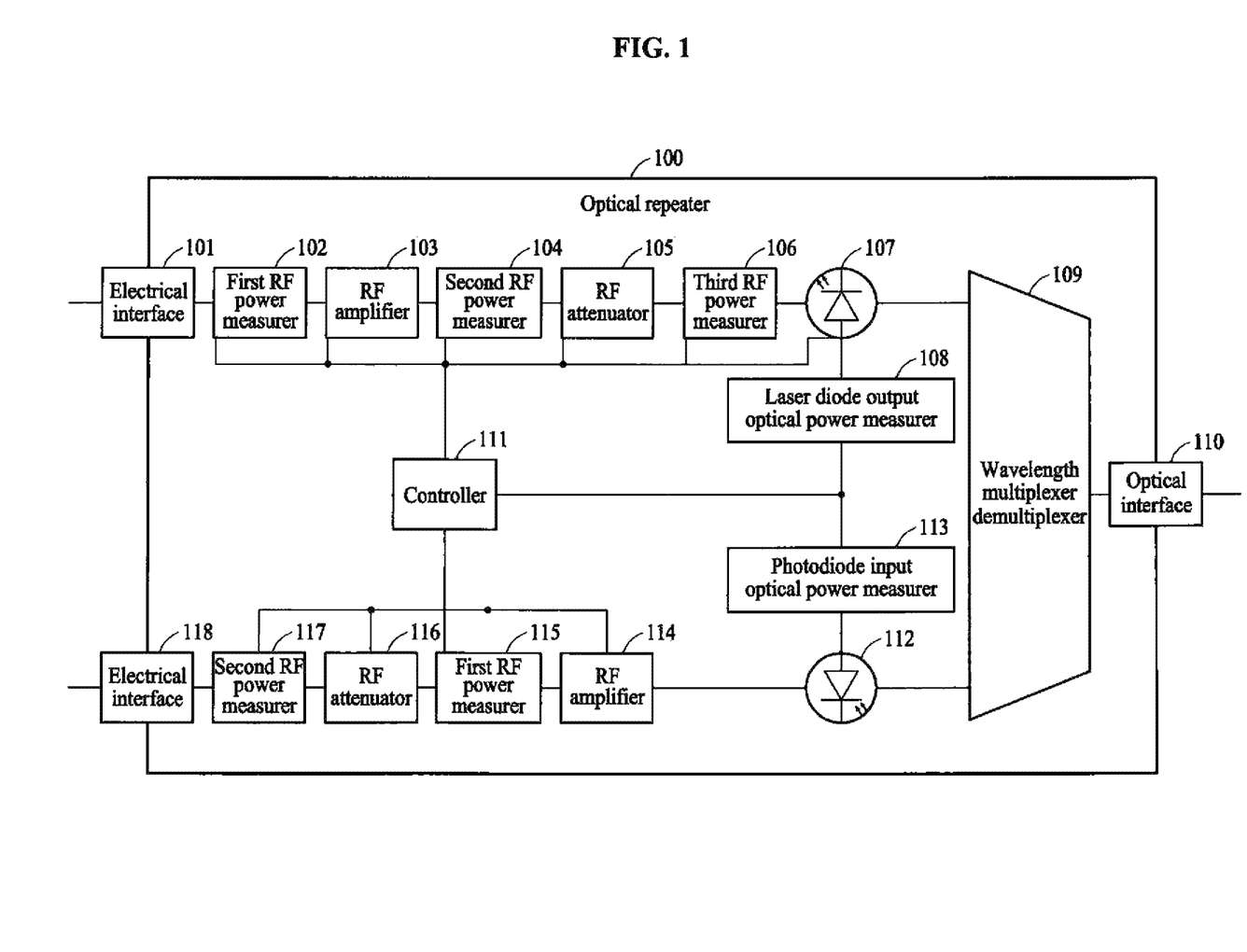
FIG. 1 is a diagram illustrating a structure of an optical repeater according to an example embodiment.

FIG. 1 is a diagram illustrating a structure of an optical repeater 100 according to an example embodiment. The optical repeater 100 may be included, as an optical transceiver, in an optical infrastructure of a mobile communication system. In detail, an input or an output of the optical repeater 100 may be connected to a radio unit at a remote location or a host unit of a central office (CO) constituting a mobile communication base station.

The mobile communication system including the optical repeater 100 may utilize an analog IFoF (Intermediate Frequency-over-Fiber) technology which uses an analog optical signal of an intermediate frequency (IF) in an optical infrastructure. In detail, an optical signal input into the optical repeater 100 or an optical signal output from the optical repeater 100 may be a baseband signal which uses an IF carrier of the mobile communication system. The optical signal having the IF transmitted or received by the optical repeater 100 may be an analog optical signal. Referring to FIG. 1, the optical repeater 100 may convert an input optical signal into an electrical signal or convert an input radio frequency (RF) signal into an optical signal. The RF signal received, by the optical repeater 100 or the RF signal generated by the optical repeater 100 through the optical-to-electrical conversion may be an analog electrical signal.

The mobile communication system including the optical repeater 100 may utilize the analog IFoF technology, whereby digital sampling, digital framing, and digital deframing operations are not necessary. Thus, a latency problem is not occurred. Further, an amount of data traffic needed to transmit a mobile signal to be provided to a user terminal may match a bandwidth of a baseband mobile communication signal. Thus, a cost for establishing and managing the mobile communication system may be reduced.

Hereinafter, a portion of the optical repeater 100 which converts an optical signal into an electrical signal will be referred to as an optical receiver, and a portion of the optical repeater 100 which converts an electrical signal into an optical signal will be referred to as an optical transmitter. The optical repeater 100 may be an analog optical transceiver including the optical transmitter which transmits an analog optical signal and the optical receiver which receives an analog optical signal.

Referring to FIG. 1, the optical repeater 100 may include an electrical interface 101 configured to receive an RF signal, as the optical transmitter. The RF signal may be an analog electrical signal corresponding to a radio signal provided to a user terminal. The optical repeater 100 may include a first RF power measurement component 102 configured to measure a power of the RF signal received through the electrical interface 101, as the optical transmitter. The optical repeater 100 may include an RF amplifier 103 configured to amplify the RF signal passing through the first RF power measurement component 102, as the optical transmitter. The RF amplifier 103 may be a low-noise RF amplifier. The optical repeater 100 may include a second RF power measurement component 104 configured to measure a power of the amplified RF signal, as the optical transmitter.

The optical repeater 100 may include an RF attenuator 105 configured to adjust an amplitude of the RF signal passing, through the second RF power measurement component 104, as the optical transmitter. The RF attenuator 105 may be a variable RF attenuator of which an attenuation level is adjusted based on an external control signal. The optical repeater 100 may include a third RF power measurement component 106 configured to measure a power level of the attenuated RF signal, as the optical transmitter. The optical repeater 100 may include a laser diode 107 configured to provide an optical signal using the RF signal passing through the third RF power measurement component 106, as the optical transmitter. The optical repeater 100 may include a laser diode output optical power measurement component 108 configured to measure a power level of the optical signal output from the laser diode 107, as the optical transmitter. The laser diode output optical power measurement component 108 may, monitor an optical modulation index (OMI) of the optical signal output from the laser diode 107. The OMI may affect a transmission performance of the optical signal.

The optical repeater 100 may include an optical interface 110 connected to an external optical link. The optical repeater 100 may include a wavelength multiplexer/demultiplexer 109 configured to transmit an optical signal output from the optical transmitter, that is, the optical signal output from the laser diode 107, to the optical interface 110. The wavelength multiplexer/demultiplexer 109 may provide the different paths for respective wavelengths of the optical signal.

The optical repeater 100 may include a controller 111 configured to adjust the power level of the optical signal output from the optical transmitter. Referring to FIG. 1, to adjust the power level of the optical signal output from the optical transmitter, the controller 111 may be connected to the first RF power measurement component 102, the RF amplifier 103, the second RF power measurement component 104, the RF attenuator 105, the third RF power measurement component 106, the laser diode 107, and the laser diode output optical power measurement component 108 included in the optical transmitter.

The controller 111 may control at least one of the RF amplifier 103, the RF attenuator 105, and the laser diode 107 based on a preset (required) OMI. In detail, the controller 111 may compare the OMI monitored by the laser diode output optical power measurement component 108 to the preset OMI. Based on a result of the comparing the OMIs, the controller 111 may control, at least one of the RF amplifier 103, the RF attenuator 105, and the laser diode 107 such that the OMI of the optical signal output from the optical repeater 100 may satisfy the preset (required) OMI. For example, the controller 111 may adjust a gain of the RF amplifier 103 or the RF attenuator 105 or adjust a magnitude of bias current of the laser diode 107.

Further, the controller 111 may adjust a signal path of the RF signal. In an example in which the gain of the RF amplifier 103 or the RF attenuator 105 is adjusted, the controller 111 may input, into the RF amplifier 103 again, the RF signal to be input into the laser diode 107. That is, the optical repeater 100 may generate an optical signal satisfying the preset OMI, for example, the OMI required by the optical link to which the optical repeater 100 is connected.

In an example in which the optical repeater 100 receives an optical signal from the optical link through the optical interface 110, the wavelength multiplexer/demultiplexer 109 may transmit the optical signal to the optical receiver. Referring to FIG. 1, the optical repeater 100 may include a photodiode 112 configured to receive the optical signal output from the wavelength multiplexer/demultiplexer 109, as the optical receiver. The photodiode 112 may provide an RF signal being an electrical signal corresponding to the received optical signal. The optical repeater 100 may include a photodiode input optical power measurement component 113 configured to measure a power level of the optical signal input into the photodiode 112, as the optical receiver. The photodiode input optical power measurement component 113 may monitor an OMI of the optical signal input into the photodiode 112.

The optical repeater 100 may include an RF amplifier 114 configured to amplify the RF signal output from the photodiode 112, as the optical receiver. The optical repeater 100 may include a first RF power measurement component 115 configured to measure the power level of the amplified RF signal, as the optical receiver. The optical repeater 100 may include an RF attenuator 116 configured to adjust an amplitude of the RF signal passing through the first RF power measurement component 115, as the optical receiver. The optical repeater 100 may include a second RF power measurement component 117 configured to measure the power level of the attenuated RF signal, as the optical receiver. The optical repeater 100 may include an electrical interface 118 configured to provide the RF signal passing through the second RF power measurement component 117, as the optical receiver.

Referring to FIG. 1, the controller 111 may be connected to the photodiode input optical power measurement component 113, the RF amplifier 114, the first RF power measurement component 115, the RF attenuator 116, and the second RF power measurement component 117 and adjust the power level of the RF signal to be output from the optical receiver. The controller 111 may control the RF amplifier 114 and the RF attenuator 116 such that the power level of the RF signal may satisfy the preset power level. For example, the controller 111 may adjust the gains of the RF amplifier 114 and the RF attenuator 116.

Furthermore, the controller 111 may adjust the signal gain of the RF signal. In an example in which the gain of the RF amplifier 114 is adjusted, the controller 111 may input, into the RF amplifier 114 again, the RF signal to be provided to the electrical interface 118. That is, the optical repeater 100 may produce an RF signal satisfying the preset power level.

The controller 111 may adjust the power level of the RF signal output from the optical receiver and adjust the power level of the optical signal output from the optical transmitter such that a signal output from the optical repeater 100 may have a power level suitable for operating the mobile communication system including the optical repeater 100. In an example in which the optical repeater 100 is connected to a radio unit or a host unit of the mobile communication system, the power level of a signal output from the optical repeater 100 and input into the radio unit or the host unit may satisfy the power level requested by the radio unit or the host unit.

Figure 2:
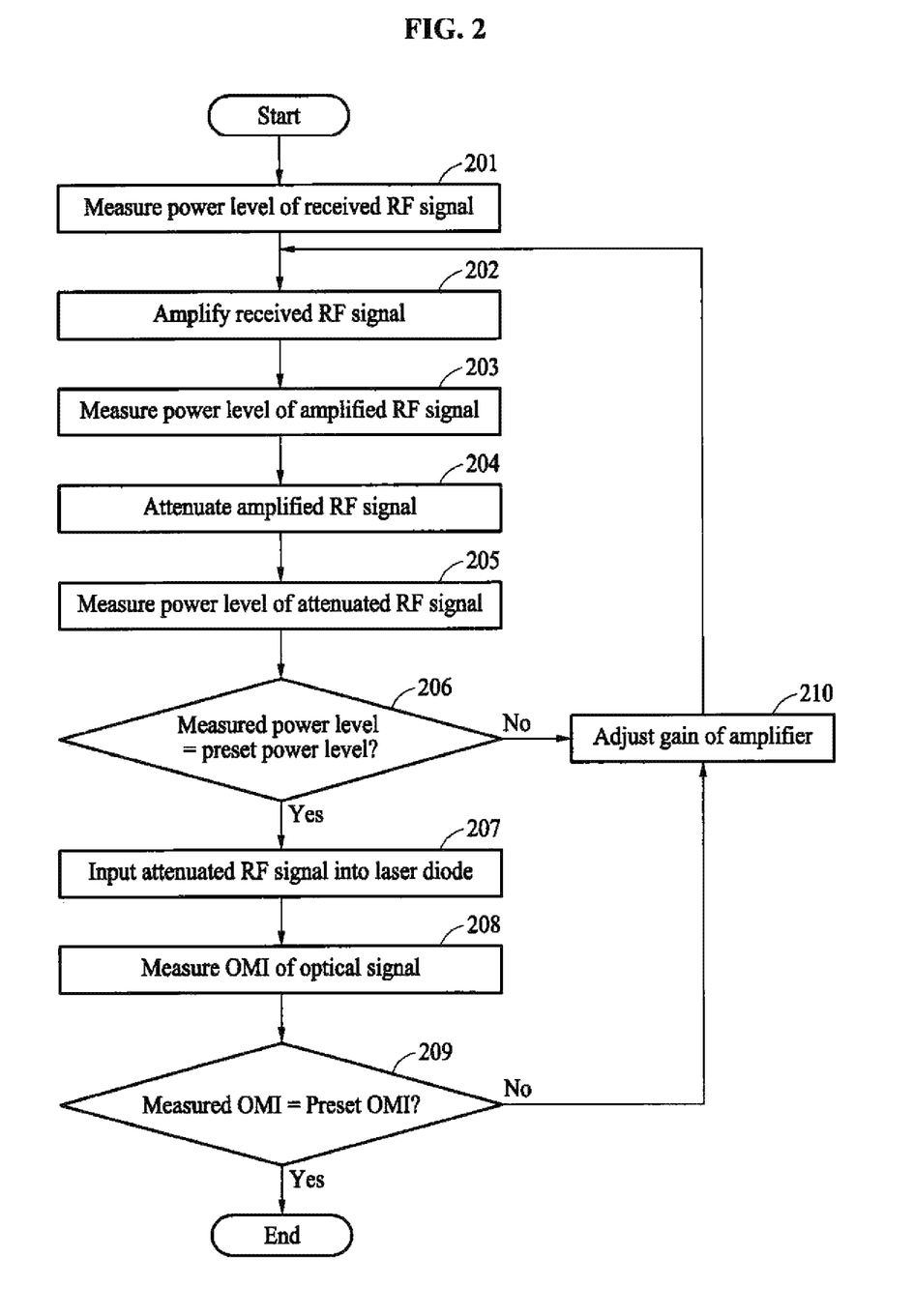
FIG. 2 is a flowchart illustrating an operation of an optical repeater generating an optical signal by converting a radio frequency (RF) signal into the optical signal according to an example embodiment.

FIG. 2 is a flowchart illustrating an operation of an optical repeater generating an optical signal by converting an RF signal into the optical signal according to an example embodiment. The operation of FIG. 2 may be performed by the optical transmitter and the controller 111 included in the optical repeater 100 of FIG. 1.

In operation 201, the optical repeater 100 may measure the power level of an RF signal received through an electrical interface. The measured power level may be utilized to control the OMI of an optical signal to be provided from the optical repeater 100 or to control the power level of an RF signal to be produced from the optical repeater 100.

In operation 202, the optical repeater 100 may amplify the RF signal received through the electrical interface. A gain of an amplifier configured to amplify an RF signal may be determined based on the power level of the optical signal to be provided from the optical repeater 100. The measured power level may be utilized to determine the gain of the amplifier configured to amplify the RF signal, for example, the RF amplifier 103 of FIG. 1.

In operation 203, the optical repeater 100 may measure the power level of the amplified RF signal. In operation 204, the optical repeater 100 may adjust the amplitude of the amplified RF signal. A level of attenuation of the RF signal may be determined based on the OMI of the optical signal to be provided from the optical repeater 100. That is, the loss of the RF signal based on the OMI may occur. The OMI of the optical signal to be produced from the optical repeater 100 may be determined based on the power level or an OMI required by a radio unit or a host unit which receives the optical signal to be provided from the optical repeater 100.

In operation 205, the optical repeater 100 may measure the power level of the attenuated RF signal. In operation 206, the optical repeater 100 may compare the power level measured, in operation 205 to a preset power level. The preset power level may be determined to be a power level needed to obtain an OMI required by an optical link connected to the optical repeater.

In an example in which the measured power level is equal to the preset power level or a difference between the measured power level and the preset power level is less than a preset threshold, the optical repeater 100 may inject the attenuated RF signal into a laser diode, in operation 207. Since the power level of the RF signal input into the laser diode is similar to the power level needed to obtain the OMI required by the optical link connected to the optical repeater 100, an optical signal output from the laser diode may have the required OMI.

In operation 208, the optical repeater 100 may measure the OMI of the optical signal output from the laser diode. In operation 209, the optical repeater 100 may compare the measured OMI to a preset OMI, for example, the OMI required by the optical link connected to the optical repeater 100.

In an example in which the measured OMI is not equal to the preset OMI, or a difference between the measured OMI and the preset OMI is greater than or equal to the preset threshold in operation 209, the optical repeater 100 may adjust the gain of an amplifier configured to amplify an RF signal, in operation 210. Similarly, in an example in which the measured power level of the RF signal does not match a preset power level, or a difference between the measured power level and the preset power level is greater than or equal to a preset threshold in operation 206, the optical repeater 100 may adjust the gain of the amplifier configured to amplify the RF signal, in operation 210. The gain of the amplifier may be adjusted based on the measured OMI or the measured power level. Furthermore, the gain of the amplifier may be adjusted based on the OMI required by the optical link.

In addition, in operation 210, the optical repeater 100 may re-amplify the RF signal input into the laser diode based on the adjusted gain. Thus, the power level of the RF signal input into the laser diode may be adjusted to satisfy the OMI required by the optical link. Without a user's control, the, the optical repeater 100 may generate an optical signal satisfying the preset OMI.

Figure 3:
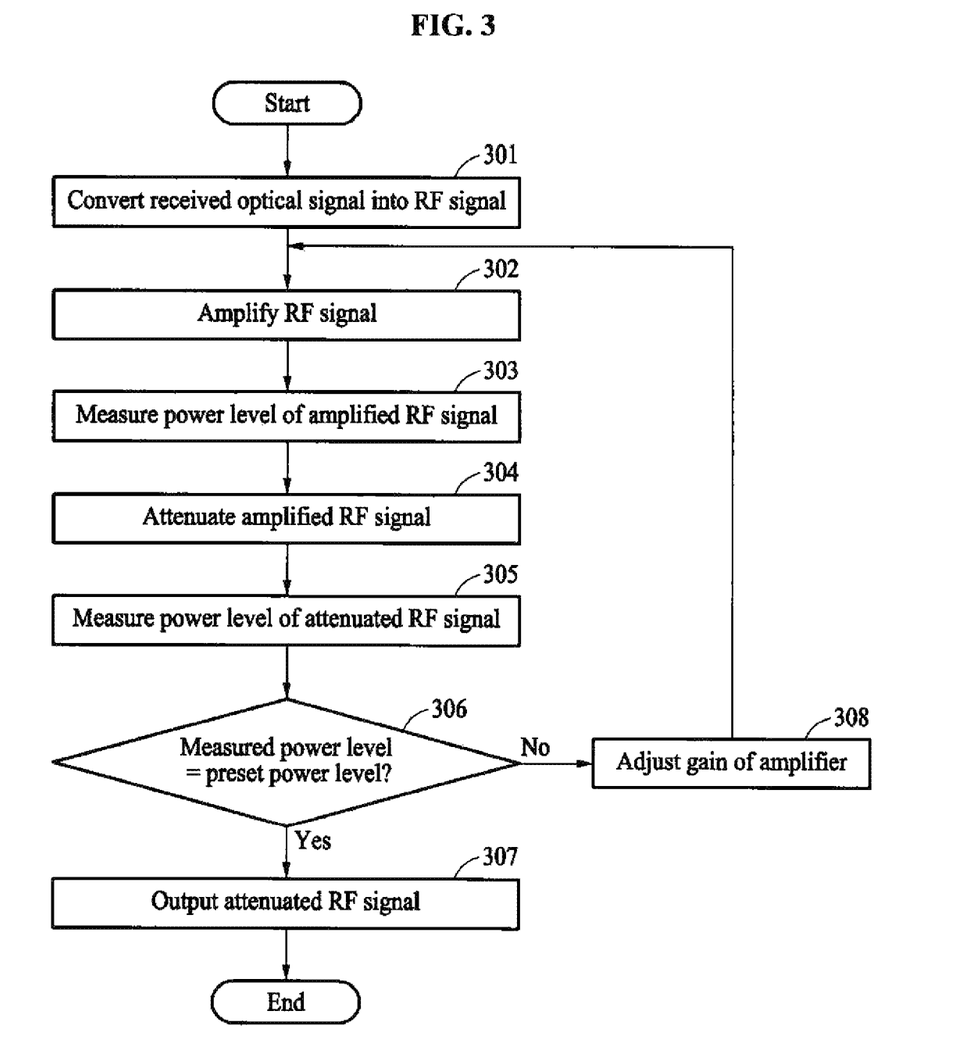
FIG. 3 is a flowchart illustrating an operation of an optical repeater generating an RF signal by converting an optical signal into an RF signal according to an example embodiment.

FIG. 3 is a flowchart illustrating an operation of an optical repeater 100 generating an RF signal by converting an optical signal into an electrical signal according to an example embodiment. The operation of FIG. 3 may be performed by the optical receiver and the controller 111 included in the optical repeater 100 of FIG. 1.

Referring to FIG. 3, in operation 301, the optical repeater 100 may convert a received optical signal into an RF signal. In a process of converting the received optical signal into the RF signal, the optical repeater 100 may measure the power level of the received optical signal. In operation 302, the optical repeater 100 may amplify the RF signal. The gain of an amplifier configured to amplify an RF signal may be determined based on the power level of the RF signal to be provided from the optical repeater 100. In operation 303, the optical repeater 100 may measure the power level of the amplified RF signal. The measured power signal may be utilized to determine the gain of the amplifier configured to amplify the RF signal, for example, the RF amplifier 114 of FIG. 1.

In operation 304, the optical repeater 100 may attenuate the amplified RF signal. A level of attenuation of the RF signal may be determined based on the power level of the RF signal to be produced from the optical repeater 100. In detail, a loss of the RF signal based on a power level required by a radio unit or a host unit which processes the RF signal of the optical repeater 100 may occur.

In operation 305, the optical repeater 100 may measure the power level of the attenuated RF signal. In operation 306, the optical repeater 100 may compare the measured power level to a preset power level. The preset power level may be determined to be a power level required by a radio unit or a host unit which is connected to the optical repeater 100 and receives the RF signal to be provided from the optical repeater 100.

In an example in which the measured power level is equal to the preset power level, or a difference, between the measured power level and the preset power level is less than a preset threshold, the optical repeater 100 may generate the attenuated RF signal to an outside through an electrical interface, in operation 307. The output of RF signal may be transmitted to the radio unit or the host unit connected to the optical repeater 100. As described above, since the preset power level is determined to be the power level required by the radio unit or the host unit, the radio unit or the host unit may receive an RF signal having a proper power level satisfying the standard of the radio unit or the host unit from the optical repeater 100.

In an example in which the measured power level is not equal to the preset power level, or the difference between the measured power level and the preset power level is greater than or equal to the preset threshold, the optical repeater 100 may adjust the gain of the amplifier configured to amplify the RF signal, in, operation 308. The gain of the amplifier may be adjusted based on the difference between the measured power level and the power level required by the radio unit or the host unit connected to the optical repeater 100. Furthermore, the optical repeater 100 may change the gain of the amplifier such that the power level of the RF signal output from the optical repeater 100 may satisfy the power level required by the radio unit or the host unit connected to the optical repeater 100.

In addition, in operation 308, the optical repeater 100 may re-amplify the attenuated RF signal based on the adjusted gain of the amplifier. For example, referring to FIG. 1, the controller 111 may input the RF signal passing through the first RF power measurement component 115 into the RF amplifier 114. Thus, the radio unit or the host unit connected to the optical repeater 100 may receive an optical signal satisfying the proper power level required by the radio unit or the host unit.

In summary, the optical repeater 100 may perform an electrical-to-optical conversion based on a power level of an optical signal or an OMI required by a radio unit or a host unit connected to the optical repeater 100. Thus, an optical signal output from the optical repeater 100 may satisfy the proper power level of the optical signal or the proper OMI required by the radio unit or the host unit connected to the optical repeater 100. In the process of converting an RF signal into an optical signal, the optical repeater 100 may measure the power levels of (1) an RF signal input into the optical repeater 100, (2) an RF signal amplified by an amplifier in the optical repeater 100, and (3) an RF signal attenuated by an attenuator in the optical repeater 100. Further, the optical repeater 100 may measure the power level or an OMI of the optical signal generated by converting the RF signal into an optical signal. The measured power level or OMI may be utilized to control elements which perform the electrical-to-optical conversion, for example, the RF amplifier 114 and the RF attenuator 116 of FIG. 1, such that the measured power level or OMI may satisfy the power level of the optical signal or the OMI required by the radio unit or the host unit.

In addition, the optical repeater 100 may perform an optical-to-electrical conversion based on a power level of an RF signal required by the radio unit or the host unit connected to the optical repeater 100. Thus, an RF signal output from the optical repeater 100 may satisfy a power level required by the radio unit or the host unit connected to the optical repeater 100. In the process of converting an optical signal into an electrical signal, the optical repeater 100 may measure the power level or an OMI of an optical signal input into a photodiode. Further, the optical repeater 100 may measure the power levels of (1) an RF signal amplified by an amplifier connected to the photodiode and (2) an RF signal attenuated by an attenuator in the optical repeater 100. The measured power level or OMI may be utilized to control elements which perform the optical-to-electrical conversion, for example, the RF amplifier 114 and the RF attenuator 116 of FIG. 1, such that the measured power level or OMI may satisfy the power level of the RF signal required by the radio unit or the host unit.

In conclusion, the optical repeater 100 may provide an optical signal having a power level or OMI suitable to be processed by the radio unit or the host unit connected to the optical repeater 100. Further, the optical repeater 100 may generate an RF signal having a power level suitable to be processed by the radio unit or the host unit connected to the optical repeater 100. Although a user may not control the optical repeater 100, the optical repeater 100 may produce the optical signal and the RF signal suitable to be processed by the radio unit or the host unit. Thus, the user convenience may improve, and a cost for managing a mobile communication system including the optical repeater 100 may be reduced.

According to example embodiments, it is possible to generate an optical signal satisfying a preset OMI.

According to example embodiments, it is possible to generate an RF signal having a preset power level.

The components described in the example embodiments of the present invention may be achieved by hardware components including at least one Digital Signal Processor (DSP), a processor, a controller, an Application Specific Integrated Circuit (ASIC), a programmable logic element such as a Field Programmable Gate Array (FPGA), other electronic devices, and combinations thereof. At least some of the functions or the processes described in the example embodiments of the present invention may be achieved by software, and the software may be recorded on a recording medium. The components, the functions, and the processes described in the example embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made, to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical transmitter included in an optical repeater of a base station for mobile communication, the optical transmitter comprising:
   an electrical interface configured to receive a radio frequency (RF) signal;
   a first RF power measurement component configured to measure a power level of the received RF signal;
   an RF amplifier configured to amplify the RF signal passing through the first RF power measurement component;
   a second RF power measurement component configured to measure a power level of the amplified RF signal;
   an RF attenuator configured to adjust an amplitude of the RF signal passing through the second RF power measurement component;
   a third RF power measurement component configured to measure a power level of the amplitude adjusted RF signal;
   a laser diode configured to generate an optical signal using the RF signal passing through the third RF power measurement component;
   a laser diode output optical power measurement component configured to measure a power level of the output optical signal; and
   a controller configured to control an operation of at least one of the RF amplifier, the RF attenuator, and the laser diode based on the power measured by the first RF power measurement component, the second RF power measurement component, the third RF power measurement component, and the laser diode output optical power measurement component such that an optical modulation index (OMI) of the optical signal satisfies a preset OMI.

2. The optical transmitter of claim 1, wherein the controller is configured to determine the OMI of the optical signal based on the power of the optical signal measured by the laser diode output optical power measurement component.

3. The optical transmitter of claim 1, wherein the controller is configured to compare the preset OMI to the OMI of the optical signal, the preset OMI determined based on a power level of an optical signal received by a radio unit or a host unit that receives the optical signal.

4. The optical transmitter of claim 1, wherein the controller is configured to adjust a gain of the RF amplifier based on a result of comparing the OMI of the optical signal and the preset OMI.

5. The optical transmitter of claim 4, wherein the controller is configured to inject the RF signal passing through the third RF power measurement component into the RF amplifier, in response to determination that the gain of the RF amplifier is to be adjusted.

6. The optical transmitter of claim 1, further comprising:
   an optical interface configured to connect the optical repeater to an optical link; and
   a wavelength multiplexer/demultiplexer configured to transmit the optical signal output from the laser diode to the optical interface, and provide an optical signal input through the optical interface to an optical receiver included in the optical repeater, the optical receiver corresponding to the optical transmitter.

7. An optical receiver included in an optical repeater of a base station for mobile communication, the optical receiver comprising:
   a photodiode configured to convert an optical signal into a radio frequency (RF) signal;
   a photodiode input optical power measurement component configured to measure a power level of the optical signal input to the photodiode;
   an RF amplifier configured to amplify the RF signal;
   a first RF power measurement component configured to measure a power level of the amplified RF signal;
   an RF attenuator configured to adjust an amplitude of the RF signal passing through the first RF power measurement component;
   a second RF power measurement component configured to measure a power level of the amplitude-adjusted RF signal; and
   a controller configured to manage an operation of at least one of the RF amplifier and the RF attenuator using the power levels measured by the photodiode input optical power measurement component, the first RF power measurement component, and the second RF power measurement component, such that a power level of the RF signal satisfies a preset power level, wherein the controller is configured to compare the preset power level to the power level of the RF signal the preset power level determined based on a power level of an RF signal received by a radio unit or a host unit that receives the RF signal.

8. The optical receiver of claim 7, wherein the controller is configured to adjust a gain of the RF amplifier based on a result of comparing the power level of the RF signal and the preset power level.

9. The optical receiver of claim 8, wherein the controller is configured to adjust the power level of the RF signal passing through the second RF power measurement component into the RF amplifier, in response to determination that the gain of the RF amplifier is to be adjusted.

10. An optical signal transmitting method performed by an optical repeater, the optical signal transmitting method comprising:
   measuring a power level of a radio frequency (RF) signal input to the optical repeater;
   amplifying the RF signal based on an amplifier gain;
   measuring a power level of the amplified RF signal;
   attenuating the amplified RF signal based on an attenuation level;
   measuring a power level of the attenuated RF signal;
   determining whether to adjust the amplifier gain by comparing the power level of the attenuated RF signal and a preset power level;
   converting the attenuated RF signal into an optical signal, in response to determination that the amplifier gain is not to be adjusted; and
   transmitting the optical signal generated by converting the attenuated RF signal,
   wherein the transmitting comprises:
   measuring a power level of the optical signal; and
   determining an optical modulation index (OMI) of the optical signal based on the power level of the optical signal.

11. The optical signal transmitting method of claim 10, further comprising:
   determining whether to adjust the amplifier gain by comparing the determined OMI to a preset OMI.

12. The optical signal transmitting method of claim 11, wherein the preset OMI is determined based on a power level of an optical signal received by a radio unit or a host unit that is connected to the optical repeater and receives the optical signal.

13. The optical signal transmitting method of claim 10, further comprising:
   amplifying the attenuated RF signal based on the adjusted amplifier gain, in response to determination that the amplifier gain is to be adjusted.

* * * * *